United States Patent [19]
Haase

[11] Patent Number: 5,776,381
[45] Date of Patent: Jul. 7, 1998

[54] PROCESS AND APPARATUS FOR THE PRODUCTION OF OPTICAL LENSES

[75] Inventor: Lothar Haase, Morsbach/Sieg, Germany

[73] Assignee: CIBA Vision Corporation, Duluth, Ga.

[21] Appl. No.: 792,689

[22] Filed: Jan. 29, 1997

Related U.S. Application Data

[63] Continuation of Ser. No. 392,561, Feb. 23, 1995, abandoned.

[51] Int. Cl.$^6$ .................................................. B29D 11/00
[52] U.S. Cl. ........................ 264/2.2; 425/352; 425/808
[58] Field of Search ........................... 264/2.2, 2.3, 2.4, 264/161; 425/352, 353, 354, 808

[56] References Cited

U.S. PATENT DOCUMENTS

| | | | |
|---|---|---|---|
| 3,380,718 | 4/1968 | Neefe | 425/808 |
| 3,670,066 | 6/1972 | Valyi | 264/148 |
| 4,008,031 | 2/1977 | Weber | 425/808 |
| 4,138,086 | 2/1979 | Mizutani | 249/116 |
| 4,211,384 | 7/1980 | Bourset | 425/808 |
| 4,569,807 | 2/1986 | Boudet | 264/2.2 |
| 4,865,779 | 9/1989 | Ihn et al. | 264/2.2 |
| 5,415,817 | 5/1995 | Shiao et al. | 425/808 |

FOREIGN PATENT DOCUMENTS

255088   2/1988   European Pat. Off.

*Primary Examiner*—Mathieu D. Vargot
*Attorney, Agent, or Firm*—Michael U. Lee; R. Scott Meece

[57] ABSTRACT

In a process for the production of optical lenses, in particular contact lenses, a lens material is introduced between two mould halves. The mould halves each have a moulding surface and enclose a cavity in the closed state of the mould. After the lens material has been introduced the two moulding surfaces are moved towards each other and the lens material is enclosed in the cavity. If necessary, the lens material enclosed in the cavity is then polymerised. The first moulding surface is provided on the one mould half and the other mould half includes a mould part that is movable inside it with a close fit in the manner of a piston and on which the second moulding surface is provided, so that by moving that mould part towards the first moulding surface the cavity is closed. For this purpose, the two mould halves are first assembled, then the movable mould part which has the second moulding surface is moved in the direction towards the first moulding surface. With the mould halves assembled, the lens material is introduced between the two moulding surfaces before the cavity is closed.

11 Claims, 6 Drawing Sheets

PROCESS AND APPARATUS FOR THE PRODUCTION OF OPTICAL LENSES

This application is a continuation of U.S. patent application Ser. No. 08/392,561, filed Feb. 23, 1995, now abandoned.

BACKGROUND OF THE INVENTION

The invention relates to a process and to an apparatus for the production of optical lenses.

Optical lenses and, in particular, contact lenses are produced in large quantities by means of casting processes in which the contact lens material is dispensed into the female mould half, the male mould half is then placed on the female mould half and the mould is closed. The cavity defined between the moulding surface of the female mould half and the moulding surface of the male mould half determines the geometrical shape of the contact lens to be produced. After the mould has been closed, the lens material enclosed in the cavity is polymerised and, in that manner, the contact lens is produced.

In such processes, so-called disposable moulds made of polypropylene are usually used which, after being used once, are either disposed of or recycled. Repeated use of the moulds has not been envisaged hitherto. This on the one hand entails relatively high expenditure on material, not to mention the fact that corresponding expenditure also arises for the disposal or recycling of the moulds. On the other hand, although the precision with which the lens surfaces are produced is very high, there is still a certain potential for improvement in this respect since, during the polymerisation process, owing to its softness the polypropylene may to some extent follow the shrinkage of the lens material caused by crosslinking, that is to say may deform, which, on the one hand, has the consequence that the mould can only be used once; on the other hand, when polypropylene moulds are used, the original moulding surface also may not be quite entirely reproduced on the lens.

A further disadvantage of that process is that, up until the last moment before the mould and therewith the cavity is closed, the cavity is in contact with the atmosphere surrounding it. Although, as a rule, the lens material reliably displaces the air present in the cavity, the possibility of air inclusions occurring in the contact lenses cannot be ruled out with this method of producing contact lenses. The contact lenses therefore have to be closely inspected after their production for the presence of such air inclusions. In cases where such air inclusions are present, the contact lens has to be sorted out and cannot be released from the factory.

SUMMARY OF THE INVENTION

It is therefore a problem of the invention to propose a process and an apparatus in order to produce optical lenses and, in particular, contact lenses without the possibility of air inclusions occurring. Furthermore, it would be desirable for the moulds also to be capable of being used repeatedly, thus making it possible for the expenditure on disposal or recycling of the polypropylene moulds to be avoided or, at least, distinctly reduced.

With regard to the process, that problem is solved by using a mould in which the first moulding surface is provided on the one mould half and the other mould half comprises a mould part that is movable inside it with a close fit in the manner of a piston and on which the second moulding surface is provided. By moving that mould part towards the first moulding surface the cavity is closed. The two mould halves are first assembled, then the movable mould part having the second moulding surface is moved in the direction towards the first moulding surface and, with the mould halves assembled, the lens material is introduced between the two moulding surfaces before the cavity is closed. As a result of introducing lens material, the air is displaced by the lens material from the region of the cavity. The air that has already been displaced from the cavity by the lens material is pressed out through the parting plane between the two mould halves as the mould closes and is thus able to escape. In that manner, lenses that are free of air inclusions can be produced very reliably.

If a suitable material is selected for the mould halves and for the mould part that is movable in the manner of a piston, they can be used several times. Parts that are especially subject to stress, such as the mould part that is movable in the manner of a piston, can be replaced after the production of a certain number of lenses. It is nevertheless possible to produce a large number of lenses with such moulds before the moulds or individual parts thereof are replaced, disposed of or recycled, which means a distinct reduction in the expenditure involved.

In one special variant of the process, the lens material is injected between the moulding surfaces by means of a nozzle. This also makes it possible to feed less flowable materials, including, in particular, already polymerised, plastically deformable materials (e.g. elastomers), if they are fed at a suitable pressure. Despite using the technique of injection into the mould, a sprue point, as is known, for example, from the manufacture of optical storage disks, is not produced on the lenses.

In one variant of the process, the mould half comprising the mould part that is movable in the manner of a piston is essentially hollow-cylindrical in construction. On the inside wall of the hollow cylinder it has an encircling groove. The mould part that is movable in the manner of a piston is acted upon by lens material from the side facing away from the moulding surface provided on it. At the point when, as the movable mould part is moved towards the moulding surface of the other mould half, the movable mould part is surrounded by the groove, lens material is introduced between the moulding surfaces through the groove, that is to say through the narrow annular gap that exists between the inside wall of the hollow cylinder and the movable mould part in the region of the groove. In this case, the lens material can act upon the movable mould part with a specific pressure and the mould part can remain in the region of the groove for a defined period so as to allow the desired amount of lens material to enter between the moulding surfaces. In other words, the pressure with which the lens material acts upon the movable mould part and the period for which the mould part remains in the region of the groove, or the speed with which it is moved towards the other mould half, can be adjusted independently of each other.

It is, however, also possible in principle for the pressure with which the lens material acts upon the movable mould part and the dimensions of the groove to be so coordinated with each other that a desired amount of lens material enters between the moulding surfaces through the groove before the mould part has travelled past the groove and no more lens material is able to enter between the moulding surfaces. Both variants permit reliable production of optical lenses and, in particular, contact lenses without air inclusions occurring and without sprue points on the lenses.

In a development of the process variants described previously, one mould half is provided with an overflow into which excess lens material is pressed as the cavity is closed. This is very advantageous for practical purposes for the reason alone that, in that way, metering-in of the lens material does not always have to be carried out with absolute accuracy so that there is never even the slightest excess of lens material. If, in contrast, a small excess of lens material is metered in between the moulding surfaces as a general principle, air will already be displaced from the region of the mould cavity by the lens material. As the mould closes, the excess lens material is then pressed into the overflow and the air, as described above, is pressed out via the parting surfaces between the two mould halves and escapes. During subsequent polymerisation (e.g. by means of UV light, heat or by using two-component materials one of which triggers the polymerisation), insofar as polymerisation is necessary and the lens material in question is not an already polymerised lens material (e.g. an elastomer), the lens material present in the overflow is likewise polymerised. After completion of polymerisation and subsequent opening of the mould, the lens can be removed. The same applies in cases where an already polymerised, plastically deformable lens material (e.g. a thermoplastic) is used from the start, except, of course, that the polymerisation process is then omitted. After the production and removal of the lens from the mould, before the next production cycle can begin, however, the polymerised lens material present in the overflow is removed from the overflow by means of a special ejection device.

With regard to the apparatus, the problem is solved by means of the fact that the first moulding surface is provided on the one mould half and the other mould half comprises a mould part that is movable inside it with a close fit in the manner of a piston and on which the second moulding surface is provided. By moving the mould part towards the first moulding surface the moulding surfaces of the two mould halves enclose the cavity. The mould according to the invention further comprises means for introducing the lens material between the moulding surfaces, which means are so arranged that, with the mould halves already assembled, they introduce the lens material between the two moulding surfaces before the cavity is closed. The advantages of such a mould correspond to the advantages already mentioned with regard to the process of the invention.

In one embodiment of the apparatus, the means for feeding the lens material comprise a nozzle which injects the lens material between the mould halves. This makes it possible to feed also less flowable materials, such as, for example, already polymerised, plastically deformable materials (e.g. elastomers), if they are fed or injected at a suitable pressure. Despite the use of the injection technique, a sprue point, as is known, for example, from the manufacture of optical storage disks, is not formed in the case of lenses produced with such a mould.

In another embodiment of the apparatus, the mould half comprising the mould part that is movable in the manner of a piston is essentially hollow-cylindrical in construction. The inside wall of the hollow cylinder has an encircling groove. The lens material acts upon the piston-like mould part from the side facing away from the moulding surface provided on it. At the point when, as the piston-like mould part is moved towards the first moulding surface, the groove surrounds the piston-like mould part, the lens material enters between the moulding surfaces through the groove. In this case, a feed device for the lens material may be provided, which presses the lens material against the movable mould part with a specific pressure. A drive for the mould part may also be provided, so that it remains in the region of the groove for a defined period of time so as to allow the desired amount of lens material to enter between the moulding surfaces. In other words, it is possible to provide here an adjustable feed device for the lens material, by means of which the pressure with which the lens material is pressed against the movable mould part can be adjusted, and a drive which can be adjusted separately from that feed device and with which the period for which the mould part remains in the region of the groove, or the speed with which it is moved towards the other mould half, can be adjusted independently of the feed device.

It is, however, also possible in principle for the pressure with which the lens material acts upon the movable mould part and the dimensions of the groove to be so coordinated with each other that a desired amount of lens material enters between the moulding surfaces through the groove before the mould part has travelled past the groove and no more lens material is able to enter between the moulding surfaces. In this case, in principle only the feed device which feeds the lens material is still required, since the dimensions of the groove are precisely so calculated that, at a specific pressure, a specific amount of lens material flows through the groove before the mould part travels past the groove. With both variants, reliable production of optical lenses and, in particular, contact lenses is possible without air inclusions occurring or sprue points existing on the lenses.

In a development of the process variants described previously which is very advantageous for practical purposes, one mould half is provided with an overflow into which excess lens material flows as the cavity is closed. This development is very advantageous for practical purposes for the reason alone that, in that way, metering-in of the lens material does not always have to be carried out with absolute accuracy so that there is never even the slightest excess of lens material. If, in contrast, a small excess of lens material is metered in between the moulding surfaces as a general principle, air will already be displaced from the region of the mould cavity by the lens material. As the mould closes, the mould part that is movable in the manner of a piston then presses excess lens material into the overflow and, as described above, presses the air out via the parting surfaces between the two mould halves so that the air escapes. During subsequent polymerisation, insofar as the lens material in question is not an already polymerised, plastically deformable material, the lens material that has been pressed into the overflow is likewise polymerised. After opening of the mould and removal of the lens, the polymerised material present in the overflow is ejected from the overflow by means of an ejection device before the next lens can be produced.

It will be appreciated that it is possible with the process and the apparatus according to the invention to produce lenses and, in particular, contact lenses that do not require any further finishing operations.

DESCRIPTION OF THE DRAWINGS

The invention is described in detail below with reference to the drawings, some of which are diagrammatic views and/or views in section and in which.

DETAILED DESCRIPTION OF THE INVENTION

Figure 1:
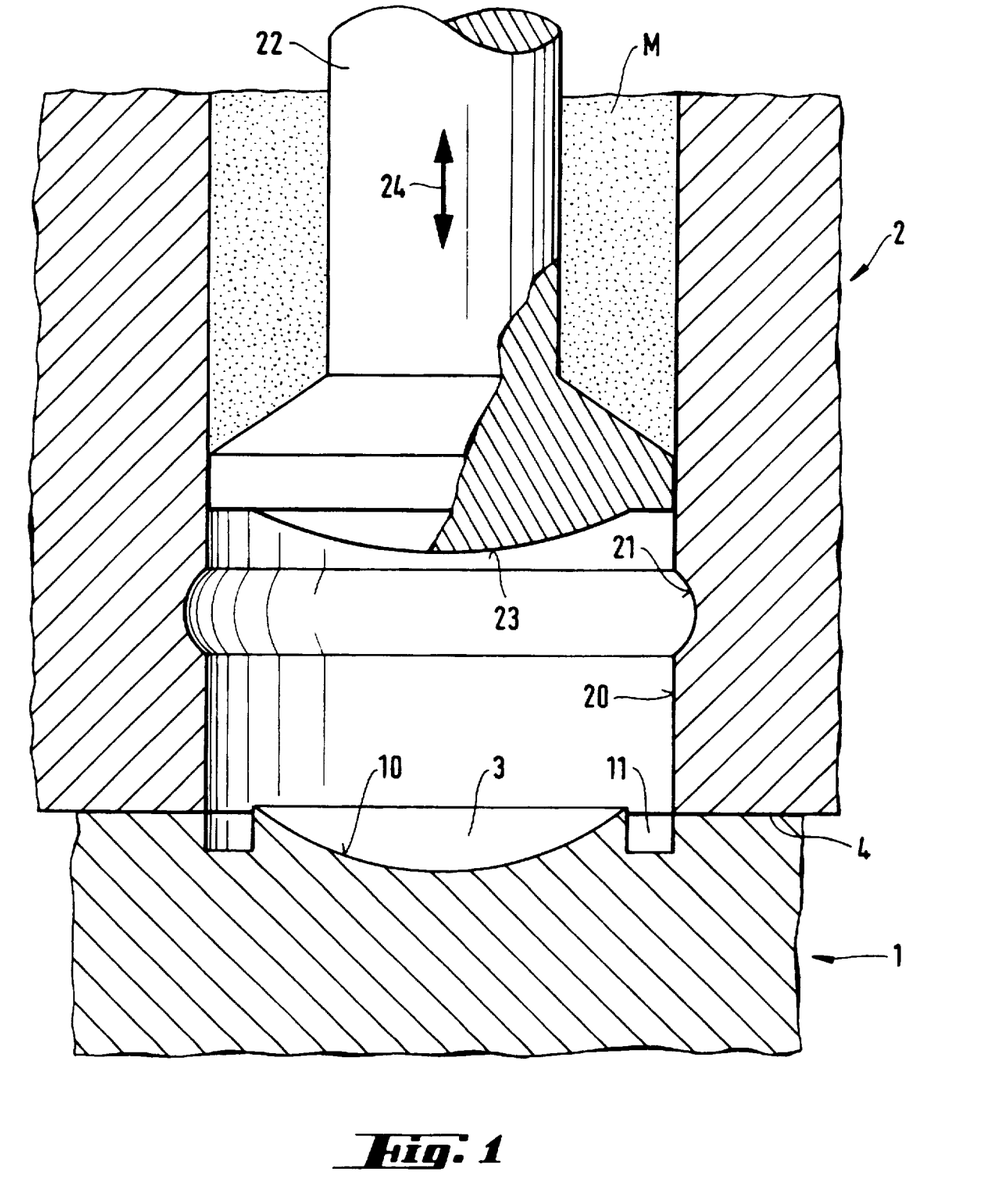
FIG. 1 shows an embodiment of the apparatus according to the invention with its essential parts.

The embodiment of the apparatus according to the invention shown in FIG. 1 comprises a mould having two mould halves 1 and 2. One mould half 1, which is in the form of a female mould half here, comprises a first moulding surface 10 and an overflow 11 which extends in a ring around the moulding surface. The other mould half 2, which is in the form of a male mould half here, has an essentially hollow-cylindrical shape. Provided on the inside wall 20 of the hollow cylinder is an encircling groove 21. Provided along the inside wall 20 is a mould part 22 that is movable in the manner of a piston and that is also a component part of the mould half 2. The second moulding surface 23 is in turn provided on that mould part 22. The mould part 22 is movable in the direction of the arrows 24 for opening and closing of the mould. In this embodiment, it is acted upon from the side facing away from the moulding surface 23 by lens material M under pressure, this pressure being shown symbolically by the arrows P.

Figure 2:
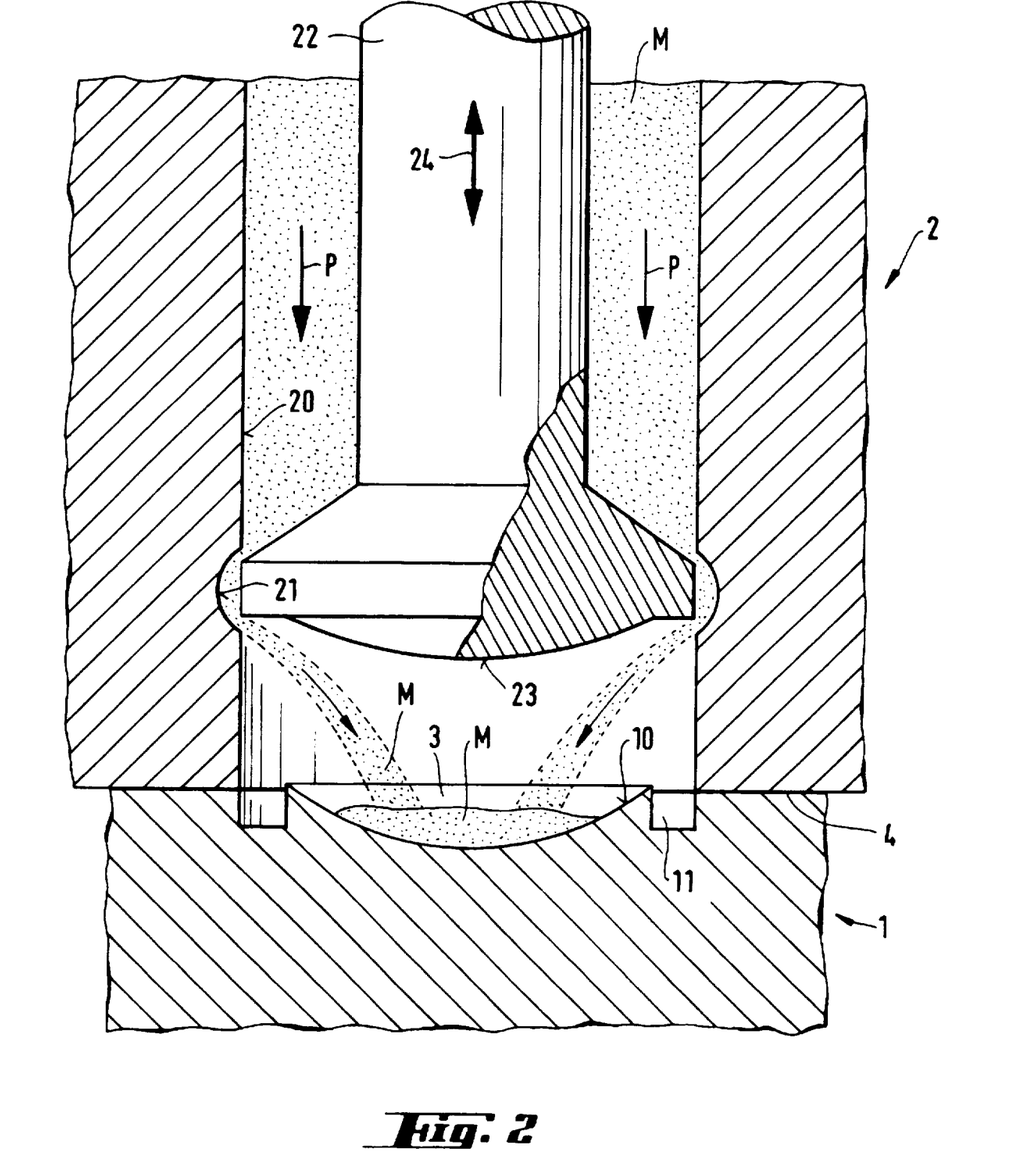
FIG. 2 shows the embodiment shown in FIG. 1 with the mould part that is movable in the manner of a piston located in the region of the groove.

To produce a lens, in particular a contact lens, the mould part 22 is moved in the direction towards the first moulding surface 10. In the course of that movement, the mould part 22 reaches a position in the region of the groove 21, in which it is surrounded by the groove 21, as shown in FIG. 2. In that position, lens material M is able to pass between the inside wall 20 and the mould part 22 through the groove 21 and between the moulding surfaces, in this case to the moulding surface 10 of the female mould half. For that purpose, the groove 21 has a shape which is so selected that the lens material M flowing through it under pressure is introduced into the moulding surface 10 of the female mould half 1. This can also be seen in FIG. 2.

A feed device (not shown) can be provided for the lens material, which presses the lens material against the movable mould part with a specific pressure. A drive (not shown) can also be provided for the mould part, which drives the mould part in such a manner that it remains in the region of the groove for a precisely defined period of time so as to allow the desired amount of lens material to enter between the moulding surfaces. It is possible, therefore, to provide both an adjustable feed device for the lens material M, by means of which the pressure P with which the lens material M is pressed against the movable mould part 22 can be adjusted, and a drive which is adjustable separately from that feed device and with which the period of time for which the mould part 22 remains in the region of the groove 21, or the speed with which it is moved towards the mould half 1, can be adjusted independently of the feed device.

Equally well, it is possible for the pressure P with which the lens material M acts upon the movable mould part 22 and the dimensions of the groove 21 to be so coordinated with each other that a desired amount of lens material M passes between the moulding surfaces 10 and 23 through the groove 21 before the mould part 22 has travelled past the groove 21 and no more lens material M is able to pass between the moulding surfaces 10 and 23. In this case, in principle only a feed device which feeds the lens material M is still required, since the dimensions of the groove 21 are precisely so calculated that, at a specific pressure P, a specific amount of lens material M flows through the groove 21 in the period during which the mould part 22 travels past the groove 21. Both methods make it possible for optical lenses and, in particular, contact lenses to be reliably produced without air inclusions occurring or sprue points existing on the lenses.

Figure 3:
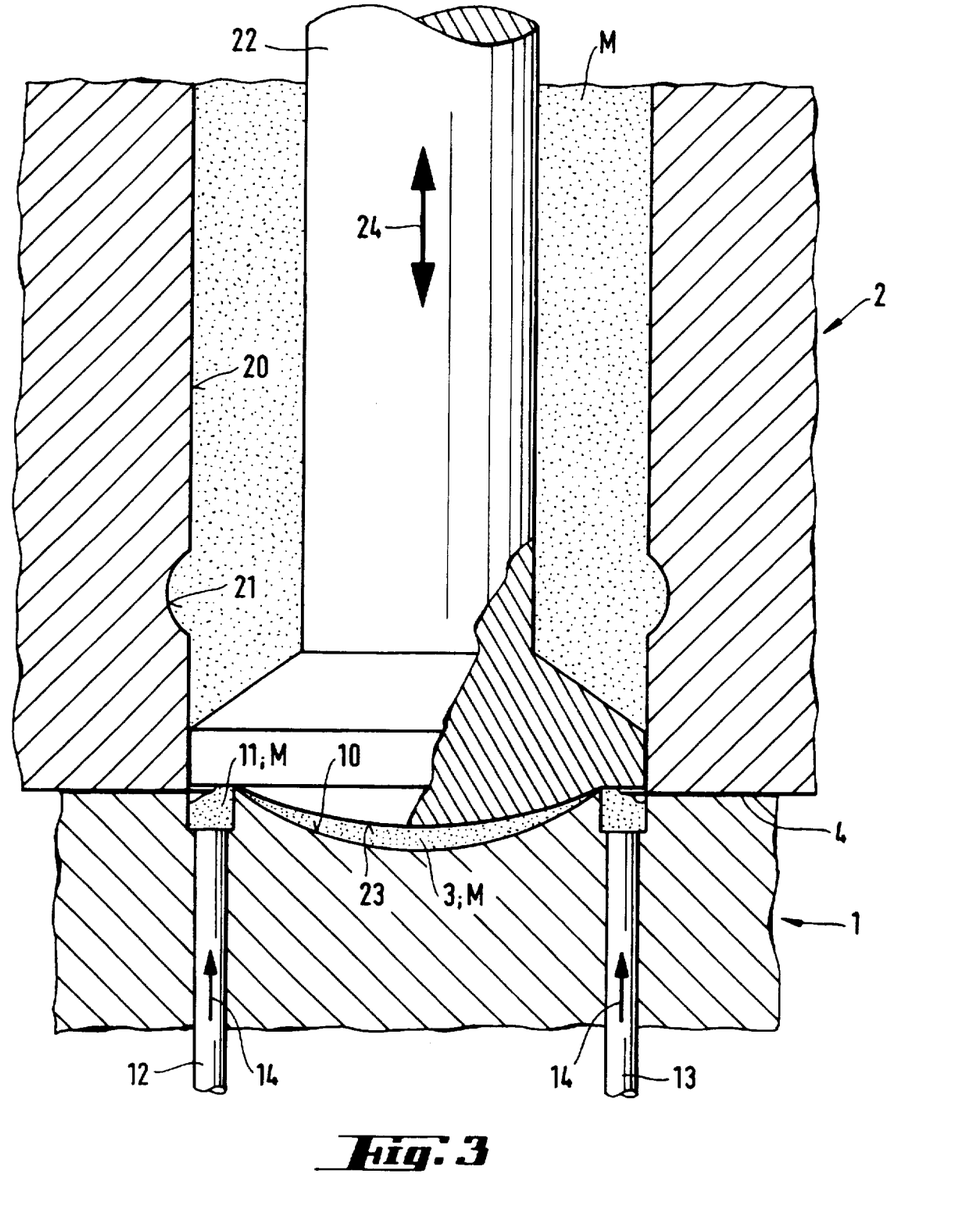
FIG. 3 shows the embodiment shown in FIG. 1 with the cavity closed.

Finally, FIG. 3 shows the mould in the closed state in which the lens material is enclosed in the cavity 3. That cavity 3 defines the shape of the contact lens to be produced. It will be seen in FIG. 3 that, as the mould closes, excess lens material M is pressed into the overflow 11. Air that may previously have been present between the two moulding surfaces is pressed out along the parting plane 4 between the two mould halves 1 and 2 during the closing operation and is thus able to escape. Thereby it is possible for lenses to be reliably produced without air inclusions.

Subsequently, polymerisation, brought about by supplying light or heat or by other measures depending upon the material, is carried out if the lens material is not in any case already a polymerised, plastically deformable material. The energy for the polymerisation does not have to be targeted at the mould cavity 3, but the excess lens material in the overflow 11 may be polymerised at the same time. It may in any case even be desirable for the excess lens material present in the overflow 11 to be polymerised. The lens material on the side facing away from the moulding surface 23, however, is not polymerised. The pressure on the material is then reduced or removed completely before opening of the mould. Subsequently, the mould is opened and the lens removed. After opening of the mould and removal of the polymerised lens, the excess, polymerised lens material present in the overflow 11 can be ejected from the overflow by means of an ejection device comprising two thin push-rods 12 and 13 not shown in FIG. 1 and FIG. 2. For that purpose, the push-rods 12 and 13 are moved in the direction of the arrows 14. This ejection device may also, of course, be in a different form. The mould halves are then assembled again, optionally after a cleaning step, and the mould part 22 is moved upward until it reaches the groove 21. The lens material M is then placed under pressure again so that the desired amount of lens material can again flow between the mould halves through the groove 21 and the next lens can be moulded.

Figure 4:
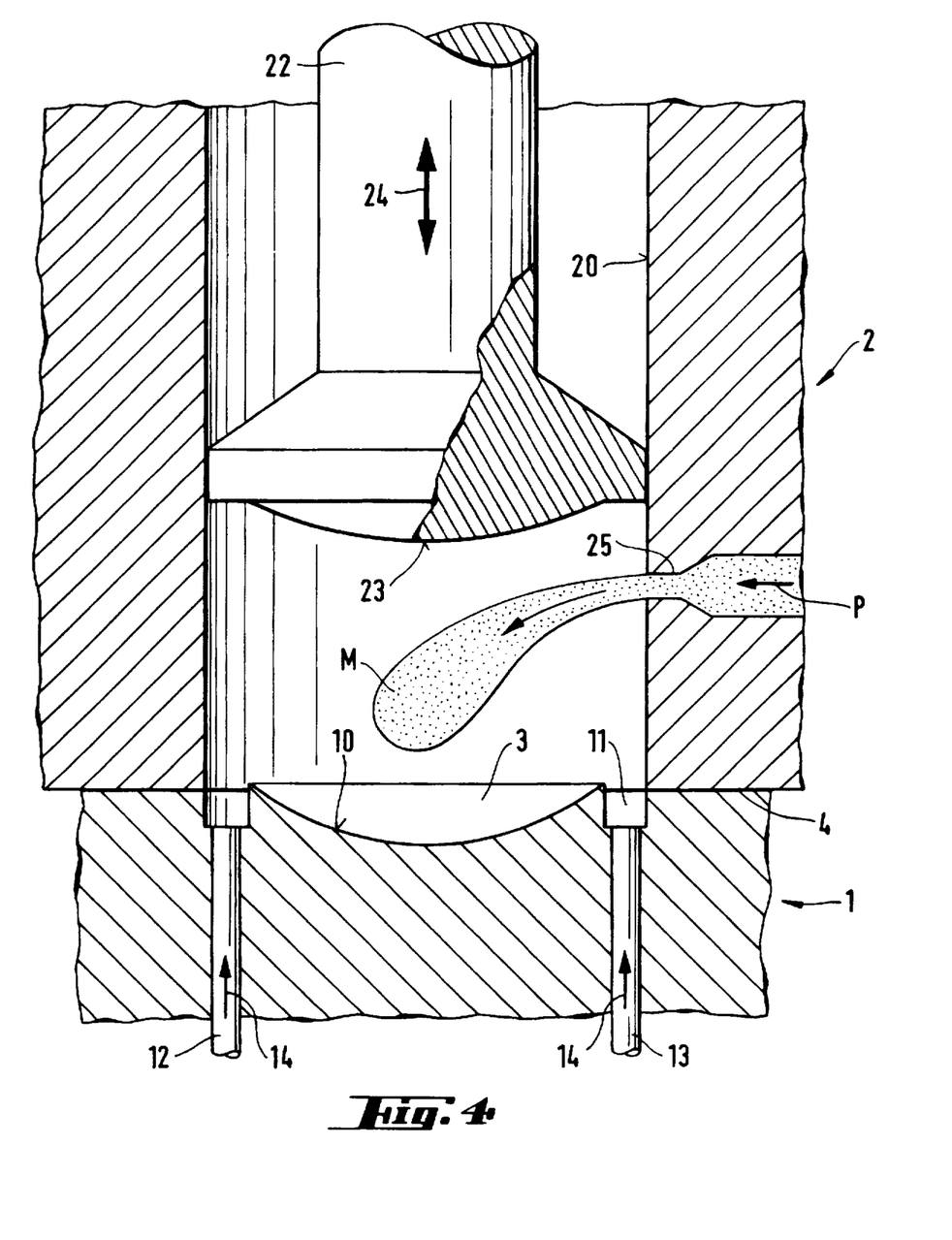
FIG. 4 shows a further embodiment of the apparatus according to the invention with its essential parts.

A further embodiment of the apparatus according to the invention is shown in FIG. 4. This embodiment significantly differs from the embodiment shown in FIGS. 1 to 3 in that the lens material M is fed not from the side of the piston-like-movable mould part which faces away from the moulding surface but through a separate nozzle 25. The lens material is injected between the mould halves by that nozzle 25. Of course, in this embodiment, no encircling groove is provided on the inside wall 20. The mould may otherwise be of substantially the same construction as that of the mould described with reference to FIGS. 1 to 3. In particular, the push-rods 12 and 13 with which polymerised material present in the overflow 11 is ejected can again be seen here also.

Figure 5:
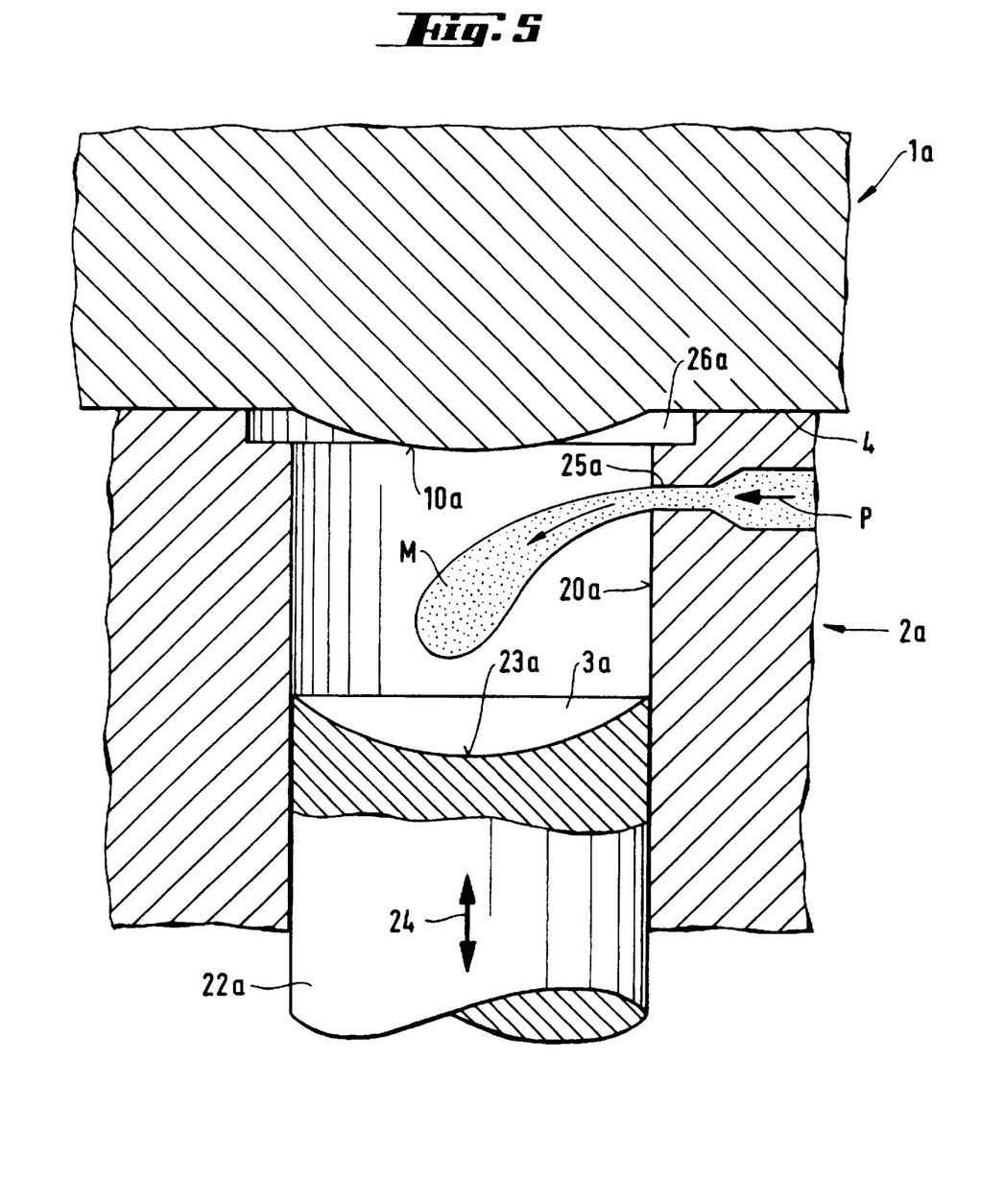
FIG. 5 shows a further embodiment of the apparatus according to the invention with its essential parts.
Figure 6:
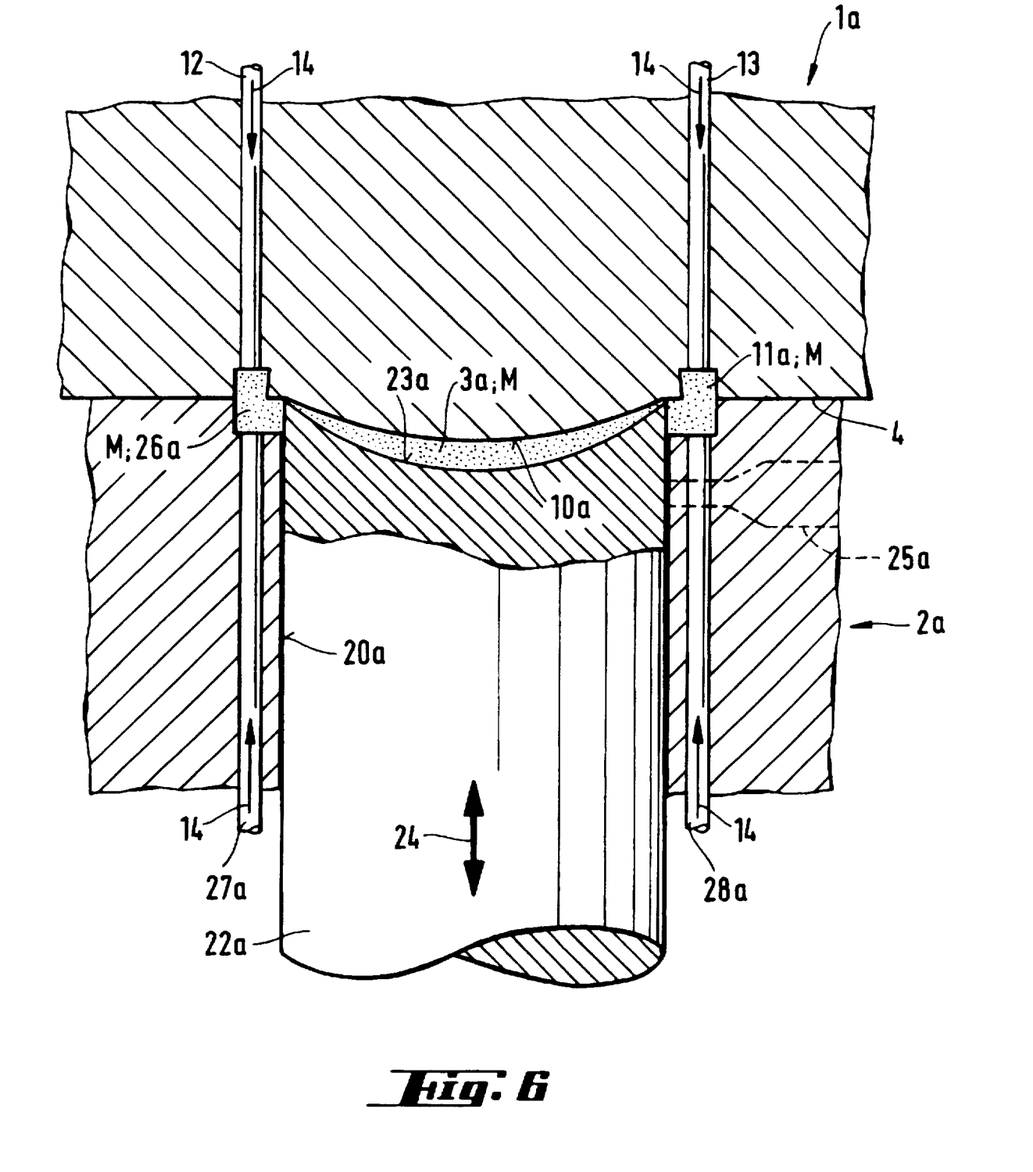
FIG. 6 shows a further embodiment of the apparatus according to the invention.

A further embodiment of the apparatus according to the invention is shown in FIG. 5. This embodiment significantly differs from the embodiments described previously in that, compared with those described previously, the mould here stands, as it were, "on its head". Moreover, the mould half 1a is in this embodiment the male mould half, as will be apparent from the moulding surface 10, and the mould half 2a is accordingly the female mould half here. A mould part 22a is similarly movable in the manner of a piston along the inside wall 20a of that mould half 2a. In contrast to the moulds described previously, however, the moulding surface 23a of the mould part 22a is concave, since the mould half 2a is, after all, the female mould half. The lens material M is injected between the moulding surfaces 23a and 10a by means of a nozzle 25a. By moving the mould part 22a in the direction towards the moulding surface 10a the mould cavity 3a is closed (FIG. 6). It is filled with lens material M. Excess lens material is pressed into the overflow 26a which, as its function requires, is provided here on the mould half 2a. Air can again escape along the parting plane 4a in a manner similar to that already explained with reference to the moulds described previously.

Finally, in FIG. 6, a further embodiment of the apparatus according to the invention is to be seen which, however, differs from the embodiment shown in FIG. 5 only inasmuch as, on the one hand, both mould halves 1a and 2a are provided with an overflow 11a and 26a and with push-rods 12a, 13a and 27a, 28a for ejecting the polymerised lens material from those overflows. In order that the polymerised plug in the overflow 11a does not fall out spontaneously, the side wall of the overflow 11a may be constructed to taper very slightly, for example the angle of taper may be about 0.5°. The overflow 26a may also taper, of course, if it is desirable that the plug in the overflow 26a does not fall out if the mould half 2a ever happens to be inverted (e.g. so that the polymerised lens falls out). In the drawing according to FIG. 6, it should also be pointed out that the nozzle 25a naturally is not arranged in the plane of the drawing since then it would conflict structurally with the push-rod 28a, of course. It has been indicated by a broken line, however, to show how the lens material M can be fed.

In the embodiments described, it is possible to use, for example, lens materials such as, for example, HEMA (hydroxyethylmethacrylate) and one or more UV, thermal or other polymerisation initiators. Silicone is also a possible material in principle, as are thermoplastics such as, for example, PMMA (polymethylmethacrylate) or CAB (cellulose acetate butyrate). In principle, both liquid materials and more or less paste-like, plastically deformable materials can be introduced between the mould halves. The amounts of the materials introduced usually range from 0.05 ml to 1000 ml. The pressures with which the lens material is fed, in particular in the case of the embodiment with the nozzle, may be in the range from 1 bar to 800 bar. The moulds may consist, for example, of metal, suitable plastics materials or also of other suitable materials, such as glass or ceramics.

It has already been mentioned above that it is possible with the described processes and apparatuses for optical lenses and, in particular, contact lenses to be reliably produced. It will be understood that the described technique is also suitable for the production of other mouldings if the moulding surfaces and geometrical dimensions of the individual elements are suitably adapted to the desired article to be produced.

What is claimed is:

1. A process for the production of an optical lens, comprising:

(a) providing a first mold half with a first mold surface;

(b) providing a second mold half comprising an inner mold part and a hollow cylindrical outer mold part having an inner wall, said inner mold part having a second mold surface facing said first mold surface and being movable in the manner of a piston along said inner wall of said hollow cylindrical outer mold part toward and away from said first mold surface;

(c) introducing a lens material between said two mold surfaces prior to said first and second mold surfaces being in a closed engagement position; and (d) moving said second mold surface towards said first mold surface until said mold surfaces are in said closed engagement position such that said mold surfaces form a closed mold cavity in which the lens material is enclosed.

2. A process of claim 1, further comprising polymerizing said lens material, thereby forming an optical lens having a defined shape.

3. A process of claim 1, further comprising the step of cross-linking said lens material, thereby forming an optical lens having a defined shape.

4. A process of claim 1, wherein the lens material is introduced between the mold halves by means of a nozzle.

5. A process for the production of an optical lens, comprising:

(a) providing a first mold half with a first mold surface;

(b) providing a second mold half with a second mold surface facing the first mold surface, wherein the second mold surface is movable in the manner of a piston relative to the first mold surface;

(c) introducing a lens material between the two mold halves prior to the first and second mold surfaces being in a closed engagement position; and (d) moving the second mold surface towards the first mold surface until the first and second mold surfaces are in a closed engagement with one another, wherein the second mold half includes an essentially hollow-cylindrical portion having an encircling groove therein, wherein the second mold surface is movable in a piston manner within the essentially hollow-cylindrical portion, whereby the step of introducing lens material between the mold surfaces occurs when the second mold surface is moved to a position in which the second mold surface is surrounded by the encircling groove.

6. A process of claim 1, wherein at least one mold half is provided with an overflow area into which excess lens material flows as the mold halves are positioned into the closed engagement position with one another, the process further comprising the step of removing the excess lens material from the mold halves by an ejection means subsequent to engagement of the mold halves.

7. A process of claim 1, wherein the optical lenses are contact lenses.

8. An apparatus for the production of an optical lens, comprising:

(a) a first mold half with a first mold surface;

(b) a second mold half comprising an inner mold part and a hollow cylindrical outer mold part having an inner wall, said inner mold part having a second mold surface facing said first mold surface and being movable in the manner of a piston along said inner wall of said hollow cylindrical outer mold part towards and away from said first mold surface;

(c) means for introducing a lens material between the mold surfaces before said mold halves are positioned into a closed engagement with one another; and (d) means for moving said inner mold part having said second mold surface towards said first mold surface until said mold surfaces are in a closed engagement position such that said mold surfaces form a mold cavity in which the lens material is enclosed.

9. An apparatus of claim 8, wherein the means for introducing the lens material comprises a nozzle through which the lens material is injected between the mold halves.

10. An apparatus for the production of an optical lens, comprising:

(a) a first mold half with a first mold surface;

(b) a second mold half with a second mold surface, wherein the second mold surface is movable in the manner of a piston relative to the first mold surface, and wherein said first and second mold surfaces form a cavity when positioned into a closed engagement with one another; and (c) means for introducing a lens material between the mold surfaces before the mold halves are positioned into a closed engagement with one another, wherein the second mold half includes an essentially hollow-cylindrical portion having an encircling groove therein, wherein the second mold surface is movable in a piston manner within the essentially hollow-cylindrical portion, whereby introduction of lens material between the mold surfaces occurs when the second mold surface is moved to a position in which the second mold surface is surrounded by the encircling groove.

11. An apparatus of claim 8, wherein at least one mold half is provided with an overflow area into which excess lens material flows as the mold halves are positioned into a closed engagement with one another, and wherein the apparatus further includes an ejection means for ejecting excess lens material subsequent to the mold halves being positioned in a closed engagement with one another.

* * * * *